United States Patent [19]
Takemoto

[11] Patent Number: 5,453,891
[45] Date of Patent: Sep. 26, 1995

[54] HEAD-ARM MECHANISM USED IN DISK APPARATUS HAVING HEAD-ARM HOLDING FUNCTION

[75] Inventor: Takashi Takemoto, Sagamihara, Japan

[73] Assignee: TEAC Corporation, Japan

[21] Appl. No.: 241,453

[22] Filed: May 11, 1994

Related U.S. Application Data

[63] Continuation of Ser. No. 886,344, May 20, 1992, abandoned.

[30] Foreign Application Priority Data

May 30, 1991 [JP] Japan ................. 3-040021 U

[51] Int. Cl.⁶ .................. G11B 5/54; G11B 5/55
[52] U.S. Cl. .......................... 360/105; 360/106
[58] Field of Search .............. 360/97.01, 105, 360/106

[56] References Cited

U.S. PATENT DOCUMENTS

| | | | |
|---|---|---|---|
| 4,881,139 | 11/1989 | Hazebrouck | 360/106 |
| 4,890,176 | 12/1989 | Casey et al. | 360/105 |
| 4,985,793 | 1/1991 | Anderson | 360/105 |
| 5,003,422 | 3/1991 | Sun et al. | 360/105 |
| 5,023,736 | 6/1991 | Kezsic et al. | 360/105 |
| 5,095,395 | 3/1992 | Wakatsuki | 360/105 |
| 5,170,300 | 12/1992 | Stefansky | 360/97.01 |
| 5,241,438 | 8/1993 | Matsushima | 360/105 |

FOREIGN PATENT DOCUMENTS

54-94214  4/1979  Japan .

*Primary Examiner*—Stuart S. Levy
*Assistant Examiner*—David D. Davis
*Attorney, Agent, or Firm*—Andrus, Sceales, Starke & Sawall

[57] ABSTRACT

A head-arm mechanism comprises a head-arm being provided with a head. The head-arm is supported so that the head-arm can rotate. The head-arm mechanism also comprises a first driver. The first driver drives the head-arm to rotate so as to make the head move on a data area of the disk during an access time. The data area is to be stored with information. In the access time the head records information on the disk or it reads information from the disk. The head-arm mechanism also comprise a second driver. The second driver drives the head-arm to rotate so as to move to a retaining or holding position so as to make the head move to a landing zone of the disk during an idle time. In the landing zone, no information is stored in the disk. In the idle time, the head does not record information on the disk nor does it read information from the disk. The head-arm also comprises a retainer or holder. The retainer or holder retains a part of the head-arm by affecting a part of the head-arm between the rotational axis and the head when the head-arm reaches the retaining position. The retainer or holder is provided in a position facing a plane of the disk.

10 Claims, 6 Drawing Sheets

HEAD-ARM MECHANISM USED IN DISK APPARATUS HAVING HEAD-ARM HOLDING FUNCTION

The present application is a continuation application of U.S. patent application, Ser. No. 07/886,344, filed May 20, 1992, and now abandoned.

BACKGROUND OF THE INVENTION

The present invention relates to a head-arm mechanism making heads move on information areas of a disk as a information storing medium so that the heads record information on the disk and/or reads information from the disk.

Figure 1:
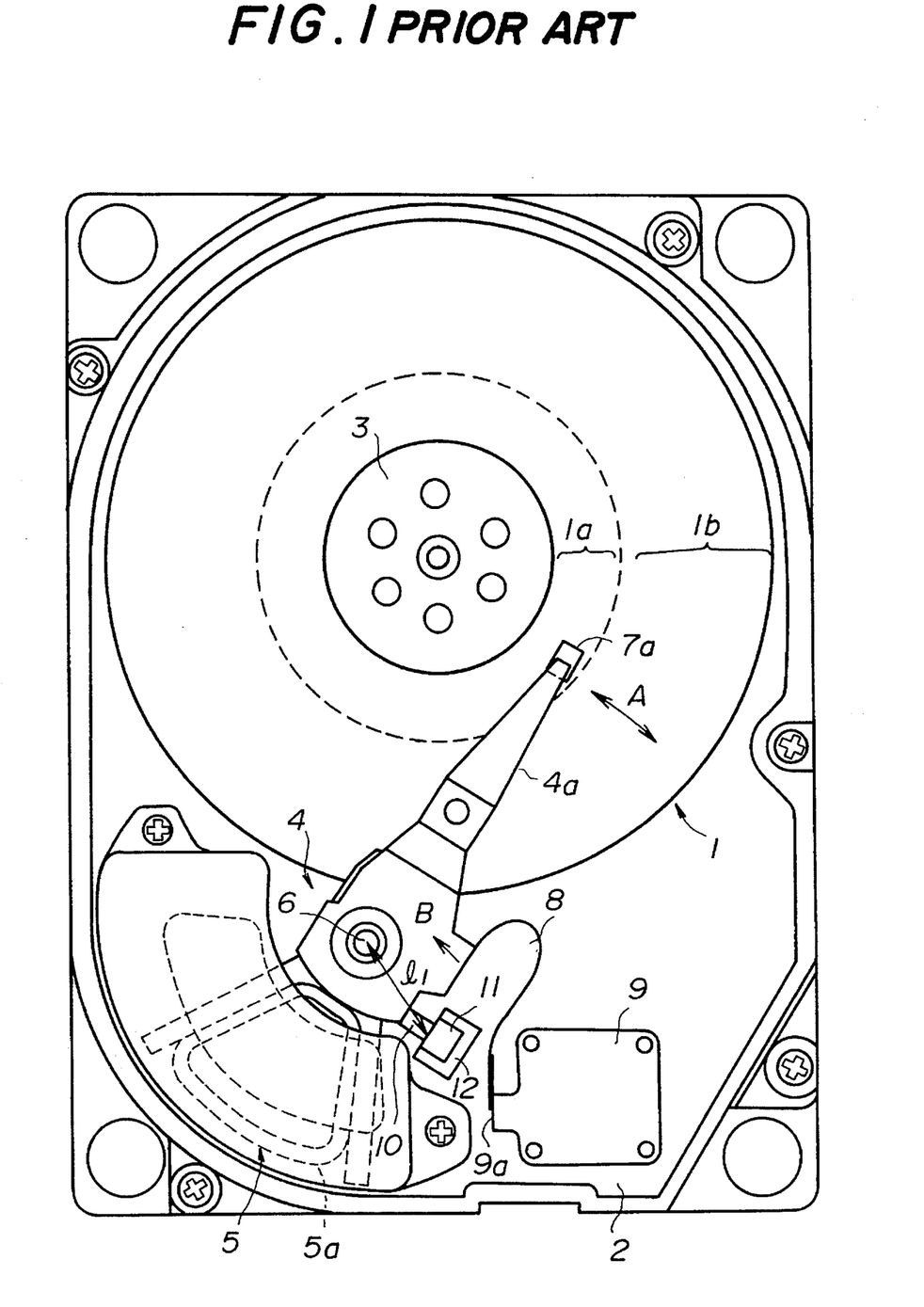
FIG. 1 shows a plan view of a hard disk apparatus applying one example of a conventional head-arm mechanism.

For example, a head-arm mechanism applied to a hard disk apparatus shown in FIG. 1, which apparatus uses a hard magnetic disk 1 as an information storing medium, includes a retaining or holding means. The retaining means retains or holds the head-arm during an idle time, in which time such recording and/or reading operation of a magnetic heads 7a, 7b is not performed. Then, the magnetic heads 7a, 7b, each of which heads 7a, 7b is provided on a respective nose end of arms 4a or 4b each of which arms 4a, 4b is respectively provided on top portions of head-arm 4, are retained on a landing zone of the disk. Landing zones 1a provided on each of front and rear surfaces of the disk 1 is located on an inner portion of the disk 1 for the heads 7a, 7b to land thereon, in which zones 1a no information is recorded. The hard magnetic disk 1 is one kind of a magnetic disk that has, for example, such a construction as made of an aluminium base being coated by a magnetic material.

On the base 2 made of die-cast aluminium, the spindle motor 3 for rotating the hard magnetic disk 1 is located, the spindle motor 3 being fixed the disk thereon. On the base 2, the head-arm 4 is also located, the head-arm being supported by the shaft 6 so that the arm can rotate, an axis of the rotation being the shaft. The head-arm is driven by the voice coil motor 5 so as to rotate in the direction designated by the arrow A as shown in FIG. 1.

The heads 7a, 7b respectively access desired tracks on the data areas 1b provided on each of front and rear surface of the disk 1, depending on the rotation of the head-arm 4, so that recording data on the data areas 1b or reading data therefrom during an access time, in which time such recording or reading operation of the heads 7a, 7b are performed is carried out.

Besides the head-arm 4, the coil 5a comprising the voice coil motor 5 and the flexible printed circuit board 8 for wiring to the magnet heads 7a. 7b from the printed circuit board 9 are located. The one end of the flexible printed circuit board 8 is connected electrically and mechanically to the folded portion 9a of the printed circuit board 9, which board 9 being located on the base 2.

The flexible printed circuit board 8 has elasticity so that the board 8 can bend due to the outside force applied thereto. Thus, as shown in FIG. 1, the board 8 is applying an elastic force to a side of the head-arm 4 in the direction designated by the arrow B. Accordingly, if the head-arm 4 is not driven by the voice coil motor 5, the magnetic heads 7a, 7b are moved in the direction of the landing zones 1a of the disk 1 due to the elastic force of the flexible printed circuit board 8 which force being applied to the head-arm 4.

A retaining means comprises the attracted chip 10, magnet 11 and holder 12.

The attracted chip 10 made of iron is fixed to the side of the head-arm 4. In the point on the base 2 near to the shaft 6 and voice coil motor 5, the magnet 11 is provided, which magnet 11 is supported by the holder 12. If the head-arm 4 is not driven by the voice coil motor 5, then to the head-arm 4 is applied the elastic force of the flexible circuit board 8 to rotate the head-arm 4 anti-clockwise so that the heads 7a, 7b respectively reach points on the landing zones 1a. Then the magnet 11 attracts the attracted chip 10 by means of a magnetic force. Thus, the heads 7a, 7b are retained on the landing zones 1a by the retaining means, and this position of the head-arm 4 where the heads 7a, 7b are respectively retained on the zones 1a is called a retained position.

However, in the conventional head-arm mechanism as shown in FIG. 1, the magnet 11 and holder 12 are provided in a position on the base 2 near the voice coil motor 5 and shaft 6. On the other hand, recently, miniaturization of a hard magnetic disk apparatus such as the example shown in FIG. 1, has become necessary. On an area of the base 2 where the disk 1 is located is located the magnet 11 and holder 12, voice coil motor 5, and also printed circuit board 9 and so on.

Here, minimizing of the area of the base 2 is directed to achieve the miniaturization of the hard disk apparatus shown in FIG. 1. Firstly, to improve the degree of freedom regarding the design of the location of parts on the base 2, for example, the arrangement of parts on the base 2 is based on the requirement that the magnet 11 is to be located in a position near the disk 1 that has not been utilized for locating parts yet. However, in the above arrangement, a magnetic field formed by the magnet 11 interferes with data stored in the data areas 1b on the disk so as to destroy the data or so that a signal/noise ratio of the data becomes degraded.

The attracted chip 10 is located in a position on the side of the head-arm 4 near the shaft. There is a distance $l_1$ as shown in FIG. 1 between the rotational axis of the head-arm 4, which acts as a fulcrum of a lever, and the position of the attracted chip 10, which is a point of application of force on the lever, is relatively short. Thus, in accordance with the well-known principle of the lever, the shorter the distance between the fulcrum and the point of application of force, the smaller the torque applied to the lever resulting from the force applied to the point of application of force.

Therefore, it is necessary to make the magnetic force of the magnet 11 large to ensure the head-arm 4 is retained at the retaining position against the elastic force applied by the flexible printed circuit board 8, or against a vibration applied from the outside to the disk apparatus using the retaining means, if the apparatus is carried by an operator.

However, if the magnetic force of the magnet 11 is made large, the magnetic force may interfere with an operation of the voice coil motor 5.

SUMMARY OF THE INVENTION

With regard to the above problems, a general object of the present invention is to minimize a disk apparatus, which apparatus records information on a disk as a information storing medium and/or reads information from the disk.

To achieve this general object of the present invention, a particular object of the present invention is to provide a head-arm mechanism comprising:

a head-arm provided a head for recording information on a disk as a information storing medium and/or reading information from the disk, and supported so that the head-arm can rotate;

a first driving means for driving the head-arm to rotate so as to make the head move on a data area of the disk, which area is stored information, during an access time in which the head records information on the disk or read information from the disk;

a second driving means for driving the head-arm to rotate so as to move to a retaining position so as to make the head move to a landing zone of the disk, in which zone no information is stored, during an idle time in which the head does not record information on nor read information from the disk; and an effective retaining or holding means for retaining the head-arm when the arm reaches the retaining position.

To achieve this particular object, for the head-arm according to the present invention, the retaining means is located in a position which faces towards a plane of the disk, which plane is extending in a radial direction of the disk. The retaining means retains the head-arm by affecting a part of the head-arm between the rotational axis and the head when the head-arm reaches the retaining position.

By this construction, a space of the front or rear side of the disk is effectively utilized. Further, it is possible that this retaining means supports the head-arm in a point respectively far from the rotation axis thereof. Thus, relatively small force is needed for this support.

A further particular object of the invention is to provide a head-arm mechanism wherein even if a magnetic field forming means is used for the above retaining means and also a magnetic disk is used as the information storing medium, a magnetic field formed by the magnetic field forming means does not interfere with data stored in the disk.

To achieve the object, in the head-arm mechanism according to the present invention, a holder made of a magnetic material is provided so as to cover at least a side of the magnetic field forming means, which side is faced toward the disk. By this construction, information stored in the disk will not suffer an interference from the magnetic field formed by the magnetic field forming means.

As mentioned above, in the head-arm mechanism according to the present invention, the retaining means is provided in a space that has not been utilized. Further, in this head-arm mechanism, even if the magnetic disk is used as the information storing medium and the magnetic field forming means is used for the retaining means, the magnetic field formed by the magnetic field forming means does not damage information stored in the disk. Thus, it is possible to miniaturize a disk apparatus applying the head-arm mechanism according to the present invention.

Other objects and further features of the present invention will become more apparent from the following detailed description when read in conjunction with the accompanying drawings.

DESCRIPTION OF THE PREFERRED EMBODIMENT

Figure 2:
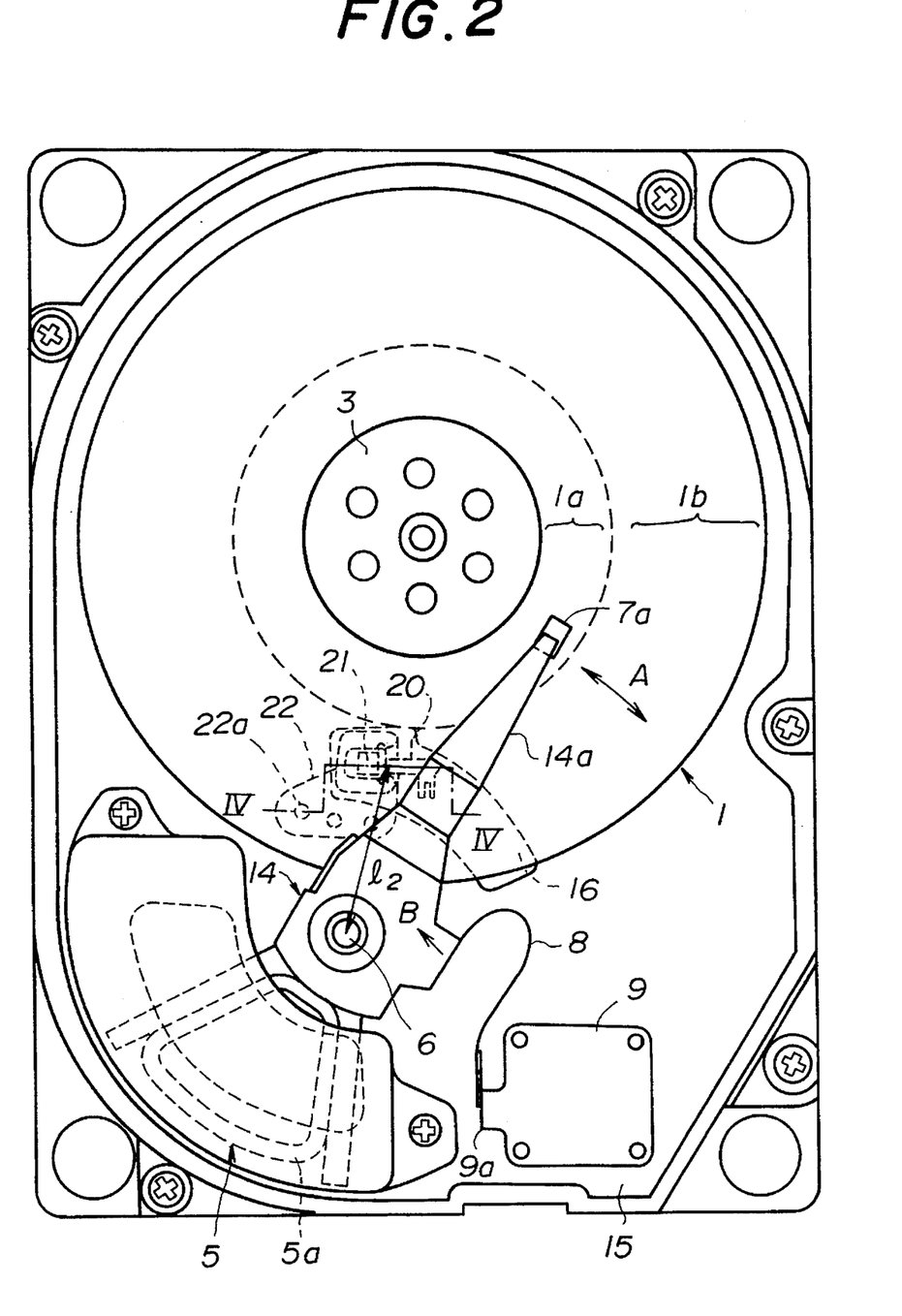
FIG. 2 shows a plan view of a hard disk apparatus applying one embodiment of a head-arm apparatus according to the present invention.
Figure 3:
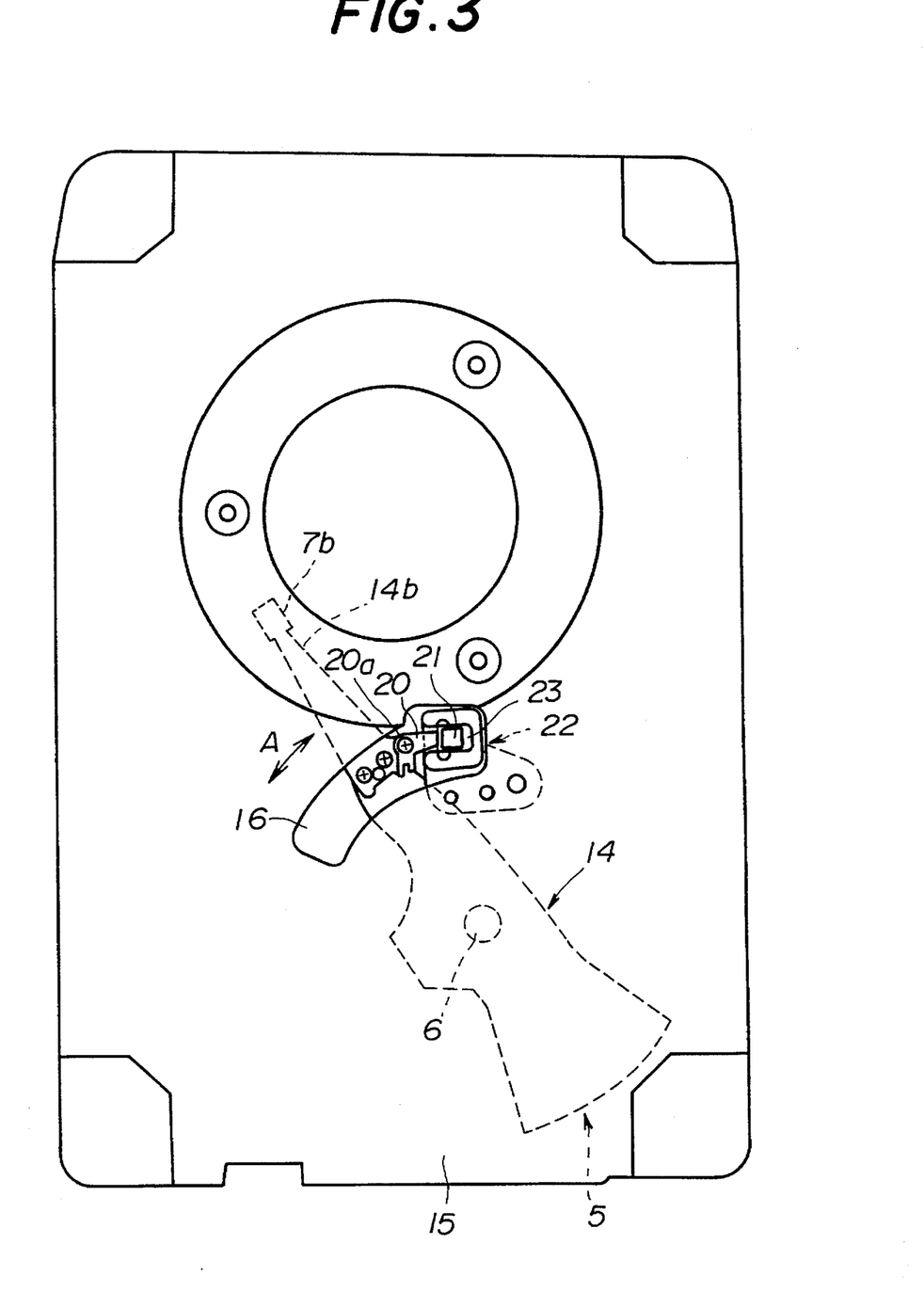
FIG. 3 mainly shows a bottom view of the head-arm mechanism in the hard disk apparatus shown in FIG. 2.

In FIG. 3, for the sake of convenience of explanation, a shape of a bottom part of the concave portion 16 is drawn by solid lines as if the bottom part of the concave portion 16 is seen through the base 15. Further, in FIGS. 2 through 4, the parts which are the same as parts of the conventional hard disk apparatus shown in FIG. 1 will be designated by the same numerals respectively, and a description thereof will be omitted.

As shown in FIGS. 2 and 3, the head-arm 14 is provided on the base 15 made of die-cast aluminium, the head-arm 14 being supported by the shaft 6 so that the arm 14 can rotate. The head-arm 14 is provided with an upper arm 14a and lower arm 14b on opposite sides of top portions thereof. Also, the arms 14a and 14b sandwich the disk 1. Here, magnetic heads 7a and 7b, each of which heads 7a, 7b is provided on a tip end of respective arm of arms 14a and 14b, is in contact with respective surface of a front and rear surfaces of the disk 1 so as to sandwich the disk 1, while no part of the arm 14a and 14b except for the heads 7a and 7b, is in contact with the disk 1.

The head-arm 14 is pushed in the direction of the arrow B by the flexible printed circuit board 8 by means of the elastic force thereof as mentioned above. The attracted chip 20 made of iron is fixed on the head-arm 14 in a position approximately central between the shaft 6 and the magnetic heads 7a, 7b by means of the screw 20a. A distance $l_2$ between the attracted chip 20 and the shaft 6 is longer than the distance $l_1$ between the attracted chip 20 and shaft 6 of the conventional hard disk apparatus shown in FIG. 1.

The concave portion 16, a shape of which portion is like an arc, is formed on the base 15 in a position of rear side of the hard disk 1 so that the attracted chip 20 can move along the concave portion when the magnetic heads 7a, 7b respectively move along the arrow A. The holder 22 made of iron is fixed on the upper surface as in FIG. 4 of the base 15 adjacent the left side end as in FIG. 2 of the concave portion 16 by means of the screw 22a, the holder 22 holding the magnet 21 in a position adjacent the end of the concave portion 16. The retaining or holding means comprises the above attracted chip 20, holder 22 and magnet 21.

Figure 5:
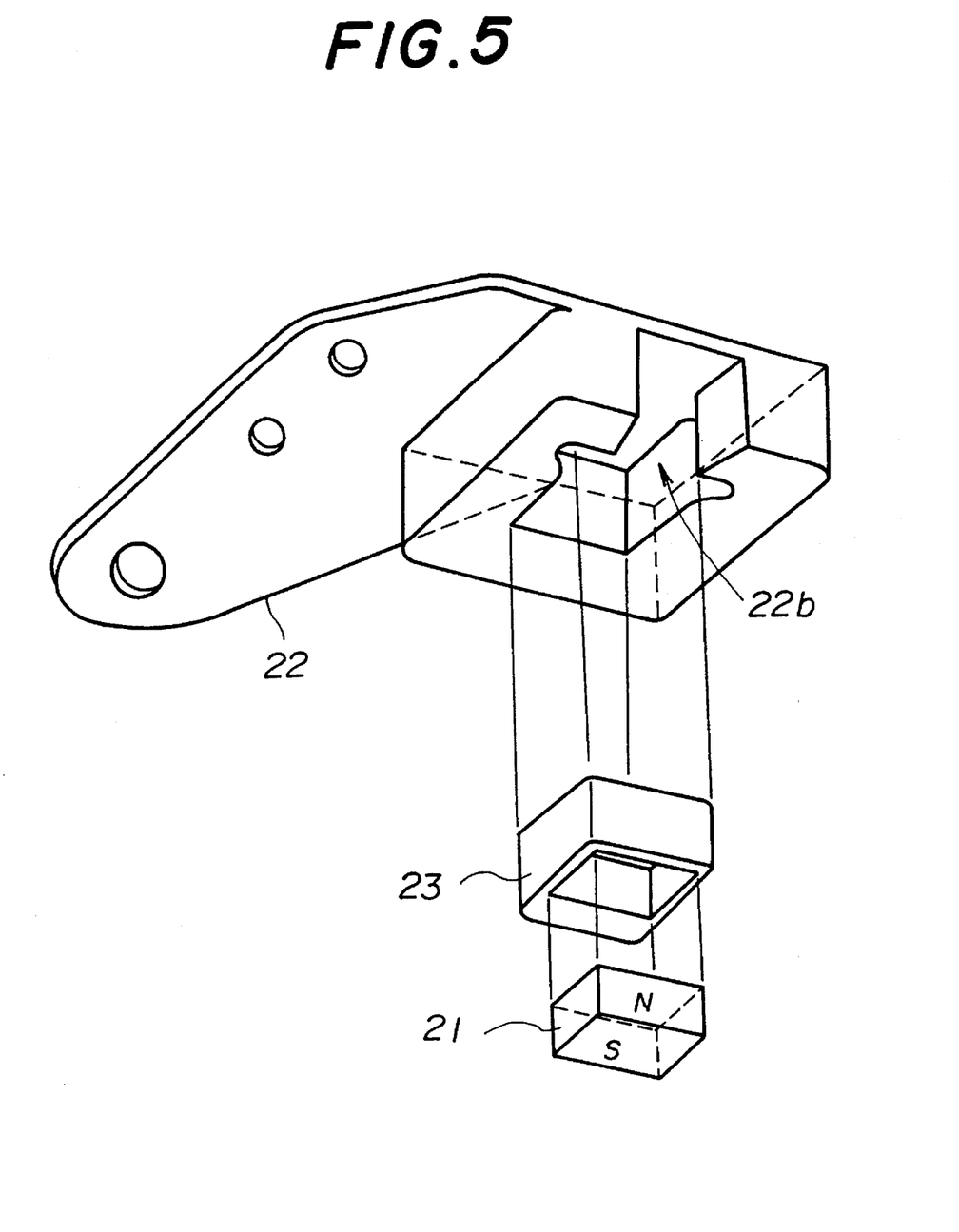
FIG. 5 shows an exploded isometric projection view of the retaining or holding means of one embodiment of the head-arm mechanism according to the present invention.

The magnet 21 shaped like a cube is fitted into the covering rubber 23 shaped like a box, as shown in FIG. 5, is also held in the space 22b formed in the holder 22. An N-pole is formed on one side of the magnet 21 faced towards the attracted chip 20, while an S-pole is formed on the other side opposite of the one side of the magnet 21.

Further, because the magnet 21 is enclosed by the holder 22 made of iron, a leak outside of a magnetic flux from the magnet 21 is restricted by the holder 22. Particularly, the upper surface as in FIG. 4 of the magnet 21, which surface is faced towards a rear side of the hard disk 1, is covered by a part of the holder 22 made of iron, which holder 22 has high permeability, so that a magnetic flux emitted by the magnet 21 does not leak in an upper direction as in FIG. 4 through the part of the holder 22 covering the magnet 21.

Figure 4:
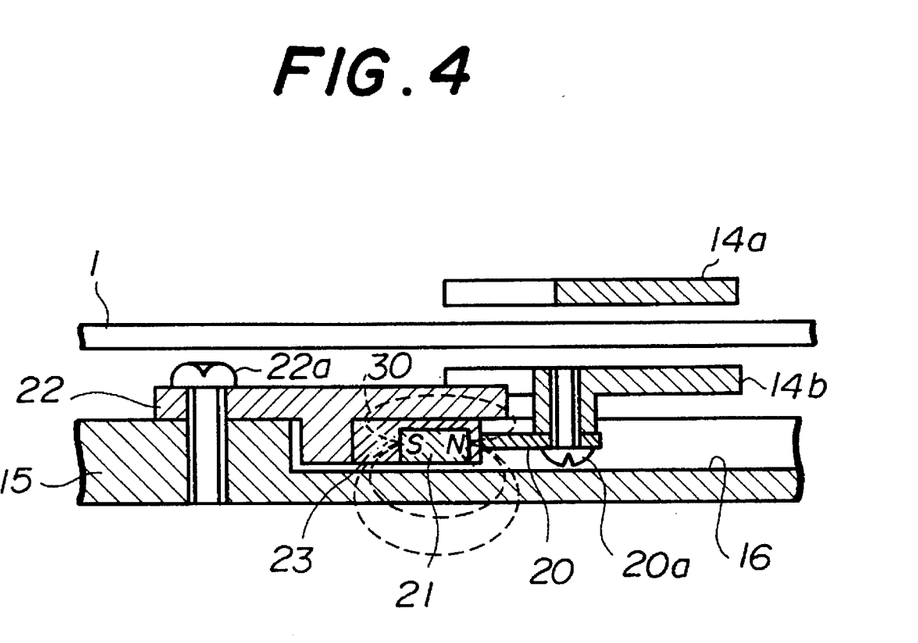
FIG. 4 shows a sectional view of a part along the line IV—IV of FIG. 2.

Further explanation about the above phenomena will be given below. In FIG. 4, a distribution of the magnetic flux generated from the magnet 21 is indicated by broken lines. As shown in the drawing, the magnetic flux in the upper side of the magnet 21 goes through inside of the part of the holder 22, so that the magnetic flux is not distributed in an upper side of the holder 22.

Thus, even if the magnet 21 is located adjacent the hard disk 1, data stored in the disk 1 is not interfered with the magnetic flux of the magnet 21.

The head-arm 14 is pushed by the flexible printed circuit 8 by means of the elastic force thereof as mentioned above. Thus, the head-arm 14 rotates so as to make the magnetic heads 7a, 7b respectively move to be adjacent the landing zones 1a of the disk 1.

Figure 6:
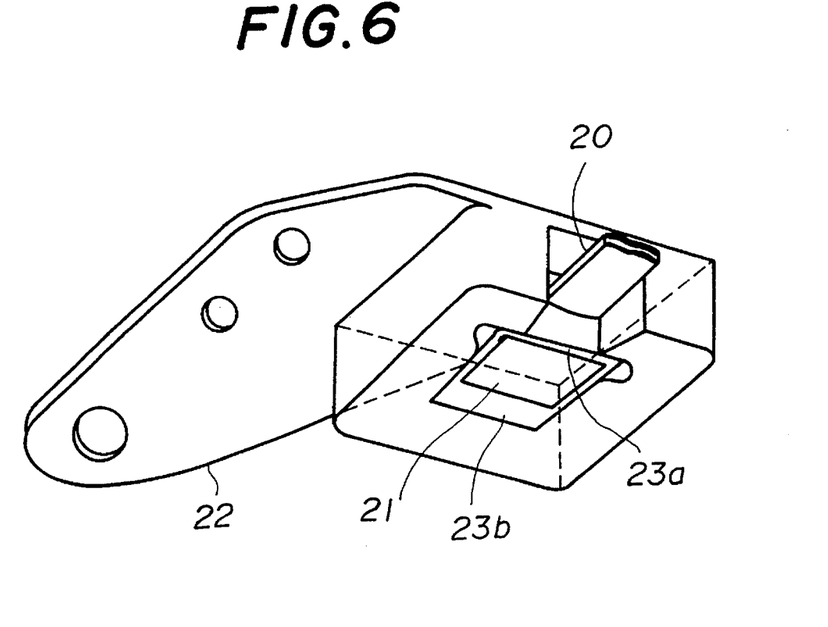
FIG. 6 shows an isometric projection view of the retaining means shown in FIG. 5.

In a position of the head-arm 14 where the heads 7a, 7b are respectively are on the landing zones 1a of the disk, the magnet 21 attracts the attracted chip 20. Then, the end of the attracted chip 20 comes in contact with the magnet 21 through the part of the covering rubber 23 as shown in FIG. 6. In this position( a retaining position hereinafter) of the head-arm 14, the magnetic heads 7a, 7b are respectively retained on the landing zones 1a.

The covering rubber 23 is formed such that a thickness of the one part 23a of the rubber 23 that will come in contact with the attracted chip 20 is relatively thin while a thickness of the other part 23b of the rubber 23 that is opposite side thereof is relatively thick. In the above construction of the covering rubber 23, a shock caused when the attracted chip 20 collides with the magnet 21 is absorbed by the part 23b of the rubber 23 by means of elastic deformation of the part 23b of the rubber 23, while the part 23a of the rubber 23 protects the magnet 21 from cracking thereof at the time of this collision.

The thickness of the part 23a of the rubber 23 is formed to be relatively thin as mentioned above, so that a distance between the surface of the magnet 21 and the end of the attracted chip 20 is relatively short. Thus, the magnetic force of the magnet 21 to attract the attracted chip 20 is sure to hold the head-arm in the retaining position.

Figure 7:
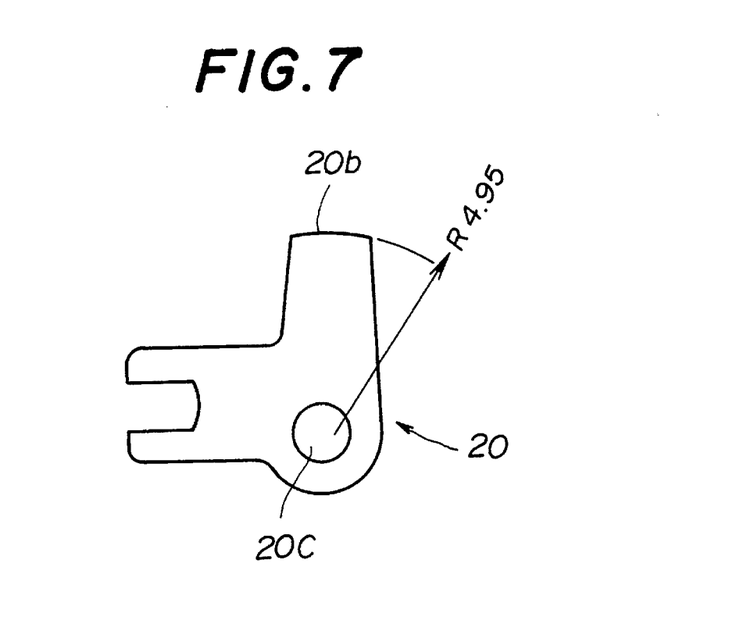
FIG. 7 shows an attracted chip used in the embodiment of the head-arm mechanism according to the present invention.

As shown in FIG. 7, the edge of the end 20b of the attracted chip 20 that will be come in contact the magnet 20 through the part 23a of the rubber 23 is formed to be curved like an arc, a radius of which arc is, in this case, 4.95 mm, and which arc is protruded to the magnet 21 as shown in FIGS. 6 and 7. Also, opening 20c is formed in the attracted chip 20, as shown in FIG. 7, into which opening 20c will be inserted the screw 20a.

In the above arc-like shape of the edge of the end 20b of the attracted chip 20, approximately one point of the edge of the end 20b comes in contact with the part 23a of the rubber 23, even if more or less error has been included in an accuracy of manufacturing and/or assembling of the hard disk apparatus. That is, an area in which area the edge of the end 20b comes in contact with the part 23a of the rubber 23, will change little, irrespective of error of manufacturing and/or assembling.

Thus, a stable amount of the elastic force, by which force the attracted chip 20 is attracted by the magnet 21, is ensured. Therefore, it is possible to use such a magnet as the magnet 21 so that an elastic force of the magnet is minimized accurately under the condition that the retaining position of the head-arm 14 is ensured by means of the elastic force of attraction of the magnet.

Further, in this construction of the head-arm mechanism, the magnet 21 of the retaining means is located on the base 15 in a position, in which position the disk 1 is also located and which position is a space at the rear side of the disk 1. Because the above position where the magnet 21 is located is far from the voice coil motor 5, the magnet 21 will not interfere with the operation of the voice coil motor 5.

Further, because the position where the magnet 21 is located is a space that has not been utilized in the conventional disk apparatus such as shown in FIG. 1, an area on the base 15 is saved. Thus, it become possible to minimize the area of the base 15. Also, minimizing of outline dimensions of the disk apparatus, which apparatus uses a head-arm mechanism such as this embodiment as shown in FIG. 2.

Also, the distance $l_2$ between the attracted chip 20 and shaft 6 in the disk apparatus shown in FIG. 2 is greater than the distance $l_1$ between the attracted chip 10 and shaft 6 in the conventional disk apparatus shown in FIG. 1. Thus, by the principle of the lever as mentioned above, a relatively small force is enough for retaining the head-arm 14 in the retaining position in the disk apparatus shown in FIG. 2.

With regard to the present invention, it may not be limited to a disk where the information storing medium is a magnetic disk but may apply to an optical disk and so on. Also, the retaining or holding means is not limited to use a magnetic field forming means such as a magnet, but other means to retain a head-arm such as a mechanically engaging means. Also a magnetic field forming means is not limited to the magnet but may be a core, which core is a wound coil and so on. Further, head-arm driving means are not limited to a combination of the voice coil motor and the flexible printed circuit board but a combination of a linear motor and a coil-shaped spring and so on.

Further, the present invention is not limited to these preferred embodiments, and various variations and modifications may be made without departing from the scope of the present invention.

What is claimed is:

1. A head-arm mechanism comprising:

a base;

a head-arm provided with a head, wherein said head records information on a magnetic disk having a disk rotation axis means rotatably supporting said disk on said base and/or reads information from the disk, and wherein said head-arm is supported so that said head-arm can rotate about a head-arm rotation axis means rotatably supporting said head-arm on said base;

first driving means for driving said head-arm to rotate so as to make the head move, during an access time, over a data area of the disk in which information is stored, and wherein in said access time the head records information on the disk or reads information from the disk;

second driving means for driving said head-arm to rotate so as to move to a holding position and to make the head move to a landing zone of the disk during an idle time, wherein in said landing zone no information is stored in the disk, and wherein in said idle time the head does not record information on the disk or read information from the disk; and holding means mounted in a recess in a surface of said base, said recess facing one side of said disk, said holding means releasably immobilizing said head-arm in said holding position against movement in any direction by attracting a part of said head-arm, said holding means being spaced from the disk along a direction parallel to the rotation axis of the disk and being located radially inward from the outer periphery of the disk so as to face said one side of said disk, said part of said head-arm attracted by said holding means being located between the head-arm rotation axis and the head, thereby to provide a compact head-arm mechanism that can retain said head-arm in the holding position in a highly effective manner, said holding means comprising a magnetic field forming means for forming a magnetic field, said magnetic field forming means being provided with covering means made of a magnetic material for covering at least a part of a portion of said magnetic field forming means facing the disk; said attracted part of said head-arm being made of a magnetic material, said attracted part being attracted to said magnetic field forming means by means of a magnetic force, said attracted part extending into said recess, said recess in said base being formed so that said attracted part of said head-arm extending into said recess can move in said recess as said head-arm moves over the data area of the disk and to and from the landing zone, said recess comprising a concavity formed in said surface of said base, said concavity having an elongated arcuate shape, which is formed substantially along the path along which said attracted part of said head-arm moves when said head moves over the data area of the disk and to and from said landing zone.

2. The head-arm mechanism according to claim 1 wherein:

said magnetic field forming means comprises a magnet;

said part of said head-arm attracted by said magnetic field forming means is made of a magnetic material; and said magnet is covered by a protection member made an elastic material, said protection member absorbing a shock, said shock being caused when said attracted part comes in contact with said magnet.

3. The head-arm mechanism according to claim 2, wherein said protection member comprises a thin part having a thickness smaller than that of any other part of said protection member, wherein said thin part contacts said attracted part.

4. The head-arm mechanism according to claim 1 wherein:

said attracted part of said hand-arm comprising a curved part, said curved part being curved so as to protrude into said magnetic field forming means.

5. The head-arm mechanism according to claim 1 wherein:

said first driving means comprises a motor; and said second driving means comprises a elastic material.

6. A disk apparatus employing said head-arm mechanism according to claim 1.

7. The head-arm mechanism according to claim 1, wherein said holding means is located on a side of said disk, by which said disk is rotatably supported on said body on which said head-arm is also rotatably supported.

8. The head-arm mechanism according to claim 1, wherein said data area and landing zone of said disk are annular with said data area located on said disk radially outwardly of said landing zone, and wherein said holding means is located adjacent said disk and proximate to said data area, said holding means being nearer to an outer edge of said landing zone in said disk than to an outer edge of said data area in said disk.

9. The head-arm mechanism according to claim 1 wherein an overall shape of said recess is substantially an arcuate configuration extending along the path in which said attracted part moves.

10. The head-arm mechanism according to claim 1 wherein said covering means is formed of a high permeability material to prevent magnetic flux produced by said magnetic field forming means from adversely affecting the magnetic information stored on said disk.

* * * * *